United States Patent [19]
Matthews et al.

[11] Patent Number: 5,844,987
[45] Date of Patent: Dec. 1, 1998

[54] COMMUNICATIONS SYSTEM AND METHOD USING VEHICLE IDENTIFICATIONS

[75] Inventors: David George Matthews, Raleigh; Amer Hassan, Cary; Paul Wilkinson Dent, Pittsboro, all of N.C.

[73] Assignee: Ericsson Inc., Research Triangle Park, N.C.

[21] Appl. No.: 780,151

[22] Filed: Jan. 3, 1997

[51] Int. Cl.⁶ ........................................ H06L 4/00
[52] U.S. Cl. ................................... 380/9; 701/1
[58] Field of Search ................ 380/9; 375/200; 379/211; 701/1, 117, 300

[56] References Cited

U.S. PATENT DOCUMENTS

| | | | |
|---|---|---|---|
| 5,034,961 | 7/1991 | Adams | 375/200 |
| 5,398,190 | 3/1995 | Wortham | 701/300 |
| 5,414,624 | 5/1995 | Anthonyson | 701/1 |
| 5,519,260 | 5/1996 | Washington | 307/10.5 |
| 5,519,621 | 5/1996 | Wortham | 701/300 |
| 5,568,406 | 10/1996 | Gerber | 701/117 |
| 5,727,057 | 3/1998 | Emery et al. | 379/211 |
| 5,737,710 | 4/1998 | Anthonyson | 701/1 |

FOREIGN PATENT DOCUMENTS

0673009  9/1995  European Pat. Off. .

*Primary Examiner*—Salvatore Cangialosi
*Attorney, Agent, or Firm*—David G. Matthews

[57] ABSTRACT

A communications system for transmitting selected information to a registered mobile terminal in response to the reporting of a vehicle identification associated with the registered mobile terminal to a database system. The communications system includes a database system having a memory with registered vehicle identifications and associated information. The database system is coupled to a radio system for receiving a reporting signal including a vehicle identification sent by a reporting mobile terminal. In response to the inputted reported vehicle identification, the database system identifies a registered vehicle identification corresponding to the reported vehicle identification and selects associated information corresponding to the identified registered vehicle identification. In the first preferred embodiment, the selected associated information includes a selected phone number and the database system sends the selected message to a registered mobile terminal associated with the vehicle identification. In a second preferred embodiment, the database system sends the selected associated information to the reporting mobile terminal. The selected associated information includes a message such as a password, codeword, or voice message.

51 Claims, 5 Drawing Sheets

COMMUNICATIONS SYSTEM AND METHOD USING VEHICLE IDENTIFICATIONS

FIELD OF THE INVENTION

The present invention is related generally to a mobile communications system and more specifically to a radio communications system for communicating with mobile terminals.

BACKGROUND OF THE INVENTION

Police officers must regularly stop drivers for questioning. Once a driver has been stopped, the police officer typically approaches the vehicle and confronts the stopped driver with questions. This confrontation between the police officer and driver is potentially a dangerous situation causing anxiety to both the police officer and stopped driver.

The police officer is placed in danger by the need to approach the stopped vehicle to question a driver who may or may not be dangerous. Numerous situations have unfortunately occurred where an police officer has been attacked after approaching a stopped vehicle to question the driver. A communications system and method allowing police to more safely question a stopped driver is needed.

Likewise, a stopped driver may also be in danger when stopped. Throughout the U.S., incidents have occurred where a driver has been illegally stopped by an impostor posing as an police officer. The impostor typically uses an unmarked vehicle and a siren to deceive a driver into stopping. Once stopped by the impostor, the driver can be robbed, assaulted, or raped. Another safety concern for a stopped driver is that legitimate police officers can abuse their authority based on personal prejudices or other reasons. A communications system and method is needed that enables a stopped driver to help verify the authenticity of an police officer.

SUMMARY OF THE INVENTION

The communications system of the present invention provides a system and method using a vehicle identification on a vehicle to enable a police officer and stopped driver to more safely communicate. The preferred application of the present invention is for use when a police officer has stopped a driver. A communications system according to the present invention can have other applications where access to information associated with vehicle identifications is required. The preferred embodiments of the present invention will be described herein for use by police officers and drivers being stopped by police officers.

The communications system includes a database system coupled to a radio system for transmitting and receiving information from mobile terminals. The database system includes a system memory having registered vehicle identifications and associated information corresponding to the registered vehicle identifications. The associated information can include phone numbers and messages such as passwords, codewords, and voice messages associated with the vehicle identifications.

In a first preferred embodiment, the vehicle identification database system transmits associated information to a registered mobile terminal located in a vehicle that has had its vehicle identification reported to the database system. For example, a police officer who has stopped a driver will transmit a reporting signal including the vehicle identification of the stopped vehicle to a radio system. The reported vehicle identification is then sent from the radio system and inputted to the database system.

The reporting signal, as defined herein, is a signal that includes the reported vehicle identification. In response to the input of the reported vehicle identification, the database system identifies a stored registered vehicle identification corresponding to the inputted vehicle identification and selects associated information corresponding to the identified registered vehicle identification. The selected associated information includes the phone number of the registered mobile terminal associated with the vehicle identification of the stopped vehicle and a corresponding associated message. The output unit of the database system uses this selected phone number to call and send the selected message to the registered mobile terminal of the stopped driver. The driver thus receives a message that can be used to help verify the authenticity of the police officer.

In a second preferred embodiment, the database system transmits associated information either to the reporting mobile terminal or directly to the registered mobile terminal. For example, a police officer who has stopped a driver will transmit a reporting signal including a vehicle identification to the radio system. The reporting signal including the vehicle identification is then transmitted from the radio system to the database system. In response to the input of the reporting signal, a registered vehicle identification corresponding to the inputted vehicle identification is identified and associated information corresponding to the identified registered vehicle identification is selected. The selected associated information includes a selected message and selected phone number associated with the identified registered vehicle identification. The database system transmits the selected associated information to the radio system which transmits the associated information to the reporting mobile terminal or directly to the registered mobile terminal of the stopped driver. If the selected associated information is transmitted to the reported mobile terminal, the reporting mobile terminal is used to transmit the selected message to the registered mobile terminal in the stopped vehicle. In addition, the selected phone number is displayed to the police officer on the reporting mobile terminal. The police officer is then able to use the displayed phone number to call the registered mobile terminal of the stopped driver.

The communications system of the present invention uses the vehicle identification of a vehicle to provide information to an police officer and/or stopped driver that can be used to minimize dangers associated with an police officer stopping a driver.

DETAILED DESCRIPTION OF THE PREFERRED EMBODIMENTS

Referring to the drawings, the communications system of the present invention is shown and indicated generally by the numeral 10. The communications system 10 is illustrated and described in applications for improving the safety of both a police officer and a stopped driver when a police officer has stopped a driver for questioning.

Figure 1:
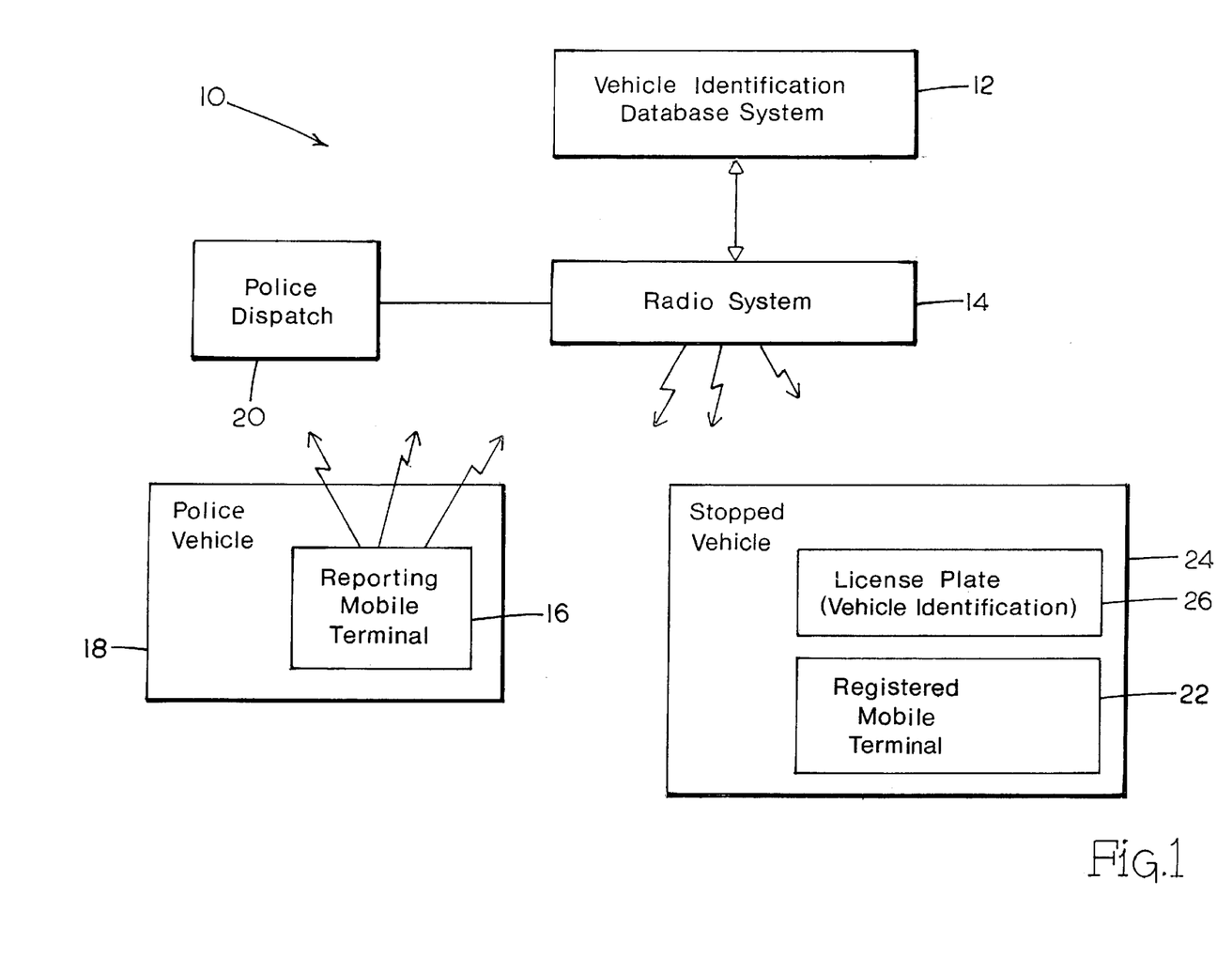
FIG. 1 shows a block diagram of a communications system according to the present invention.

Referring to FIG. 1, a communications system 10 is generally shown and includes a vehicle identification database system 12 coupled to a radio system 14. Database system 12 stores registered vehicle identifications and associated information including phone numbers and messages for registered mobile terminals. By coupling database system 12 to radio system 14, database system 12 can be used to communicate with a reporting mobile terminal 16 and a registered mobile terminal 22. In the preferred applications, reporting mobile terminal 16 is a radio mobile terminal carried by a police officer or installed in a police vehicle 18. Registered mobile terminal 22 is a radio mobile terminal carried by a driver or installed in a vehicle 24.

Reporting mobile terminal 16 is used by the police officer to transmit a reporting signal including the vehicle identification shown on the license plate 26 of stopped vehicle 24 by transmitting a reporting signal to police dispatch 20 and to radio system 14. Radio system 14 sends the reporting signal to database system 12 where the reported vehicle identification is inputted. In response to the inputted vehicle identification, database system 12 identifies the registered vehicle identification corresponding to the inputted vehicle identification and selects associated information that corresponds to the selected registered vehicle identification. The selected associated information can be the mobile phone number and/or a message such as a password, codeword, or voice recording. The database system 12 then sends an information signal including the associated information to either the reporting mobile terminal 16 or registered mobile terminal 22. An information signal, as defined herein, is a signal that includes selected associated information. The police officer or stopped driver receives the associated information and can use the associated information for calling the registered mobile terminal 22, as general information, or for authentication purposes.

Figure 2:
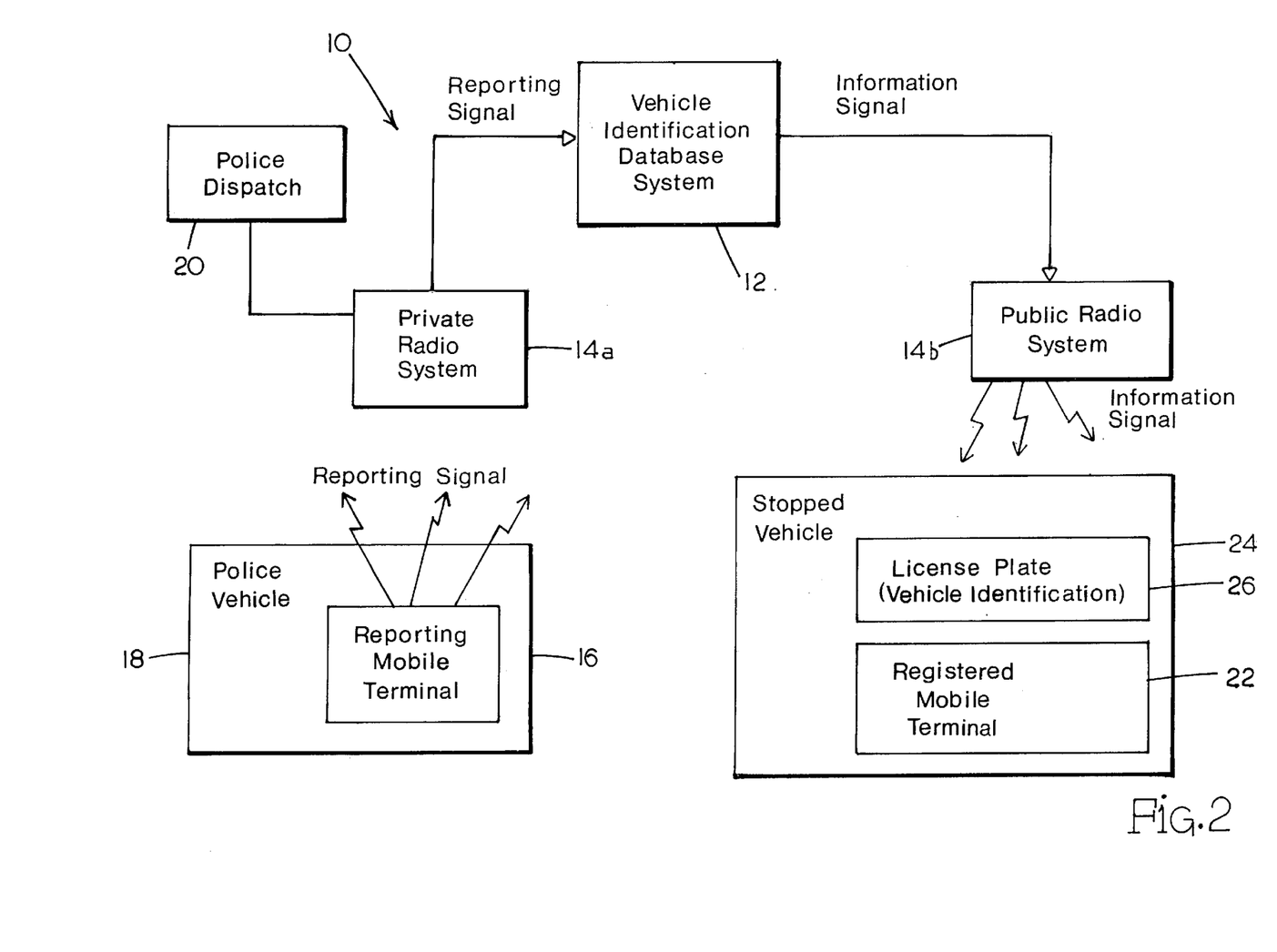
FIG. 2 shows a block diagram of a first preferred embodiment of a communications system according to the present invention.

Referring to FIG. 2, a first preferred embodiment of communications system 10 is shown in more detail. Communications system 10 includes database system 12 coupled to a private radio system 14*a* and a public radio system 14*b*. Located in police vehicle 18 is a reporting mobile terminal 16 for transmitting a reporting signal to private radio system 14*a*. The reporting signal transmitted includes the vehicle identification shown on license plate 26 of stopped vehicle 24. The reporting signal may also include other information such as the phone number of the reporting mobile terminal number and other information which is transmitted to police dispatch 20 when a police officer stops a driver.

The reporting signal is transmitted to private radio system 14*a* which is used by the police for mobile communications between police officers and police dispatch 20. Because of security concerns, the reporting signal may be encrypted according to prior art standards used by police to protect sensitive radio communications. Private radio system 14*a* directs the reporting signal to police dispatch 20 and to database system 12. Private radio system 14*a* and database system 12 can be coupled by a radio or fixed-line communication link or by the public switched telephone network. In FIG. 2, private radio system 12 is shown with a direct communication link to database system 12. Private radio system 12 may also be coupled to database system 12 through police dispatch 12 or through the public switched telephone network.

Private radio system 14*a* includes programmed instructions directing the reporting signal to the database system 12. The reporting signal transmitted from private radio system 14*a* to database signal includes the reported vehicle identification. The reporting signal, as defined herein, is a signal that includes the reported vehicle identification. In addition, the reporting signal includes header data that identified the data being transmitted in the reporting signal and enables private radio system 14*a* to properly direct the reported vehicle identification to database system 12. Information contained in the reporting signal transmitted by the reporting mobile terminal 16 that is police confidential is not transmitted to database system 12.

Database system 12 is designed to use the reported vehicle identification in sending selected associated information corresponding to the reported vehicle identification to registered mobile terminal 22. Referring to Table 1 shown below, database system 12 stores a number of registered vehicle identifications and associated information. For example, Table 1 shows that the first registered vehicle identification is "NC0001" and that the associated information corresponding to the first registered vehicle identification is as follows: registered phone number "(919) 111-0001," the password "Red," the codeword "110101" and the voice message "1." As shown by Table 1, other registered vehicle identifications have other corresponding associated information.

TABLE 1

| Registered Vehicle Identifications | Associated Information | | | |
|---|---|---|---|---|
| | | Messages | | |
| | Registered Phone Number | Password | Codewords | Voice Messages |
| NC 0001 | (919)111-0001 | Red | 110101 | 1 |
| NC 0002 | (919)111-0002 | Jasper | 110010 | 2 |
| NC 0003 | (919)111-0003 | Plant | 100010 | 3 |
| . | . | . | . | . |
| . | . | . | . | . |
| . | . | . | . | . |
| ****** | *************** | ****** | ****** | ****** |

In response to the input of the reported vehicle identification, database system 12 accesses the registered vehicle identifications to identify the registered vehicle identification matching the reported vehicle identification. After identification, the associated information corresponding to the identified vehicle is selected. Using Table 1 as an example, if the reported vehicle identification is "NC 0001," then database system 12 would identify the first registered vehicle identification as a match and would select the corresponding associated information to be registered phone number "(919) 111-0001," password "Red," codeword "110101," and voice message "1."

Accordingly, the selected associated information includes a registered phone number and message that may include a password, a codeword, and a voice message. The selected phone number is the mobile phone number for the registered mobile terminal 22 that is used by the stopped driver. The selected message can include a password selected by the stopped driver, a codeword such as a codeword key, or a voice message.

The codeword associated with the vehicle identification can be a long pseudo-random sequence such as used in military applications or CDMA systems. Alternatively, a public key system can be used. If a public key system is used, a codeword key or encryption key is associated with the vehicle identification and stored in database system 12. A corresponding codeword key or decryption key is required to decrypt the codeword key or any associated information encrypted using the codeword key. The corresponding codeword key associated with the reported vehicle identification is stored in the registered mobile terminal 22 for decrypting selected messages. The codeword key is kept confidential by the operator of database system 12 to help ensure that only the trusted operator of database system 12 can transmit selected messages to drivers. The corresponding codeword keys can also be kept confidential and only provided to the individual registered drivers. In the alternative, the corresponding codeword keys can be published for public use while the codeword keys are kept confidential to ensure that only the operator of database system 12 can transmit associated information that will be received by the registered mobile terminal 22.

The database system 12 uses the selected phone number to call registered mobile terminal 22. More specifically, database system 12 is coupled to public radio system 14b by a communication link. The communication link can be achieved by a radio or fixed-line link to public radio system 14b or by connecting database system 12 to the public switched telephone network.

The database system 12 calls the registered mobile terminal 22 by dialing the selected phone number and waiting for the registered mobile terminal 22 to answer the phone call. In response to the registered mobile terminal 22 answering the call, database system 12 sends an information signal including the selected message to the registered mobile terminal 22 over the communication link established. The registered mobile terminal 22 of the stopped driver receives the selected message and the driver can use the received selected message to help verify the authenticity of the police officer.

Figure 3:
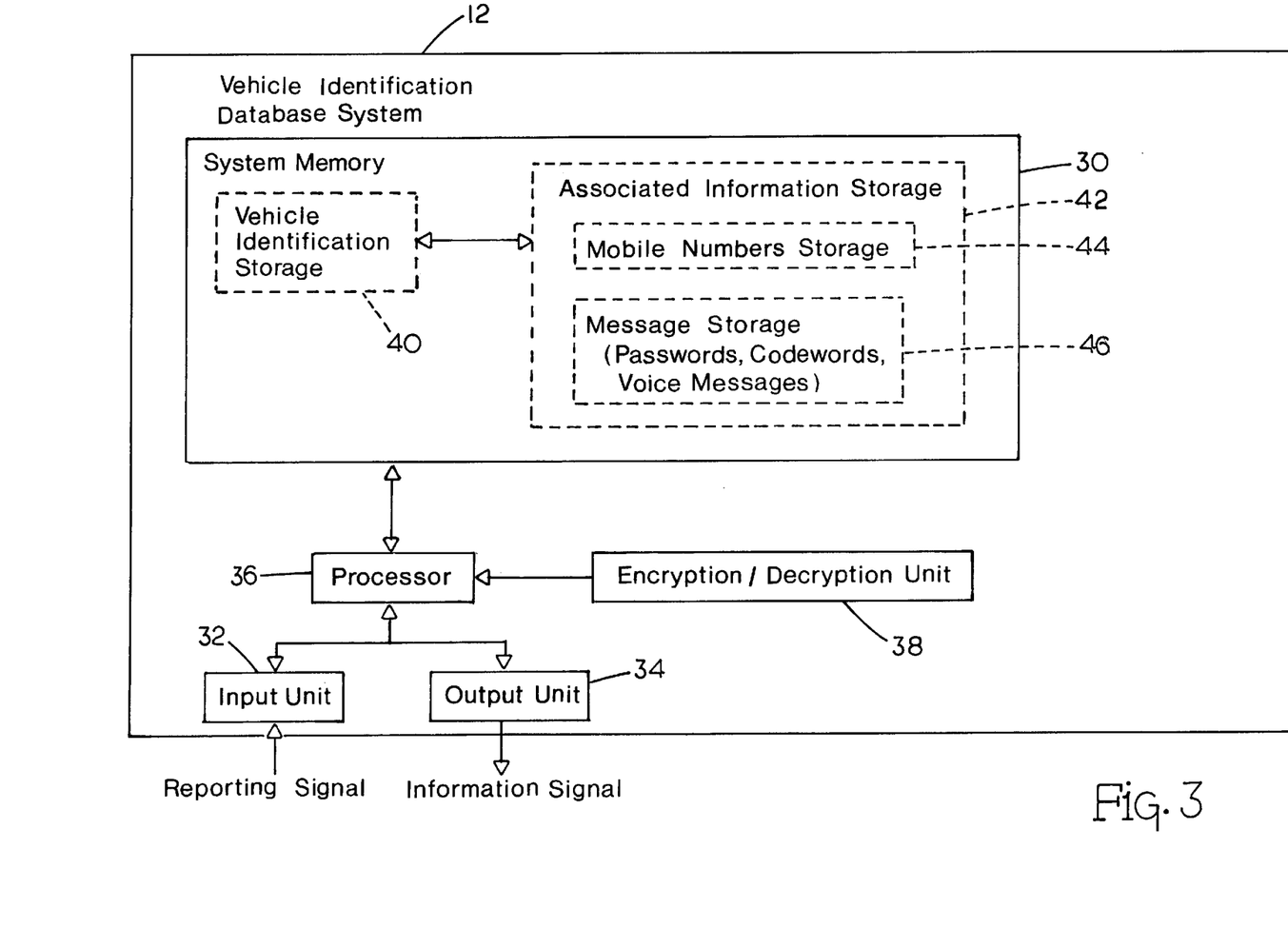
FIG. 3 shows a block diagram of a database system according to the present invention.

Referring to FIG. 3, a block diagram of database system 12 is shown in more detail. Database system 12 includes a system memory 30, an input unit 32, an output unit 34, a processor 36, and an encryption/decryption unit 38. System memory 30 includes vehicle identifications storage 40 for storing registered vehicle identifications and associated information storage 42 for storing associated information corresponding to the registered vehicle identifications. The associated information storage 42 can further be divided into a mobile numbers storage 44 for storing phone numbers corresponding to the registered vehicle identifications and messages storage 46 for storing messages such as passwords, codewords, and voice messages corresponding to the registered vehicle identifications. Standard database memories and tools can be used to store the registered vehicle identifications and corresponding associated information in system memory 30.

Processor 36 is connected with system memory 30 and is used to match a reported vehicle identification with the corresponding registered vehicle identification and to select the associated information corresponding to the selected registered vehicle identification. Processor 36 is coupled to input unit 32 for receiving a reporting signal including the reported vehicle identification and to output unit 34 for sending the selected associated information to the registered mobile terminal 22. Input unit 32 and output unit 34 are standard input/output interfacing equipment providing interfacing between a database system and a radio system or public switched telephone network. Input unit 32 receives the reporting signal and sends the reported vehicle identification to the processor 36 for the processing needed to select the associated information corresponding to the reported vehicle identification. Output unit 34 receives the selected associated information from the processor 36. In response to receiving the selected associated information, the output unit 34 first uses the selected phone number to call the registered mobile terminal 22. When registered mobile terminal 22 answers the call, a communication link is formed between registered mobile terminal 22 and the database system 12, and output unit 34 sends the selected message to the registered mobile terminal 22. Encryption/decryption unit 38 is also coupled to processor 36 and can be used to encrypt the selected message prior to sending the message to output unit 34 and registered mobile terminal 22. The encryption/decryption unit 38 can also be used to decrypt, if necessary, the reporting signal received at the input unit 32. The encryption/decryption unit 38 provides security to prevent the unintentional disclosure of information being sent between the reporting mobile terminal 16, registered mobile terminal 22, and database system 12. Police departments are moving towards the use of digital private radio systems that include encryption/decryption for the communication link between mobile terminals and the police dispatch.

In operation, the communications system 10 of the first preferred embodiment operates as follows. A driver registers with database system 12. To register, the driver provides to the database system 12 the vehicle identification displayed on the license plate 26 of her vehicle 24 and the phone number of the mobile terminal she carries while driving the vehicle 24. The phone number provided for the mobile terminal can be a phone number for the mobile terminal which is different from the general-use phone number normally used. In addition, the driver registering with database system 12 provides a password that is known only to the driver or voice message that may include a password or voice recording made by the driver. Security measures are taken to assure that the associated information stored in database system 12 remains confidential. After registering with the database system 12, the driver is sent a corresponding codeword key that can be stored in the registered mobile terminal 22 for use in decrypeting a codeword key associated with the registered vehicle identification and phone number. Once registered with database system 12, database system 12 allows a user to authenticate a police officer stopping vehicle 22 as discussed below.

According to standard procedure, a police officer stops a driver for questioning by flashing the lights or turning on the siren of the police vehicle 18. The police officer then uses the reporting mobile terminal 16 to report the vehicle identification on the license plate 26 of the stopped vehicle 24. The police officer enters the vehicle identification using a keypad on the reporting mobile terminal 16 and the reporting mobile terminal 16 transmits over a data channel a reporting signal that includes vehicle identification data representing the reported vehicle identification. Data headers can accompany the vehicle identification data to identify to the private radio system 14a and database system 12 that vehicle identification data is being transmitted from the reporting mobile terminal 16 for input to database system 12. Alternatively, the police officer can report the vehicle identification to the police dispatch over a voice channel and the police dispatch 20 can send the reporting signal including the reported vehicle identification to database system 12.

The database system 12 receives the reported vehicle identification and processes the reported vehicle identification to identify the stored registered vehicle identification corresponding to the reported vehicle identification, and then selects associated information corresponding to the reported vehicle identification. If no matching registered vehicle identification is identified, then the database system takes no further action. The selected associated information includes a selected phone number for the registered mobile terminal 16 and a selected message. The database system 12 uses the selected phone number to call and send the selected message to the registered mobile terminal 22.

The driver who has been stopped by the police officer carries the registered mobile terminal 22 in the vehicle 24. After being stopped by the police officer, the driver waits for the call from the database system 12. As discussed, database system 12 uses the selected phone number to call the registered mobile terminal 22. The driver answers the call and receives the selected message from database system 12. The selected message can be the password previously selected by the driver which can be displayed on the display or outputted by the speaker of the registered mobile terminal 22. The selected message can also be a codeword key. The registered mobile terminal 22 is programmed to use the corresponding codeword key stored in registered mobile terminal 22 to decrypting the codeword key received from database system 12. The registered mobile terminal outputs an authentication message using the display or speaker of the registered mobile terminal 22 in response to decrypting a codeword key received from database system 12. The driver uses the output of the selected message by the registered mobile terminal 22 to authenticate the police officer.

Figure 4:
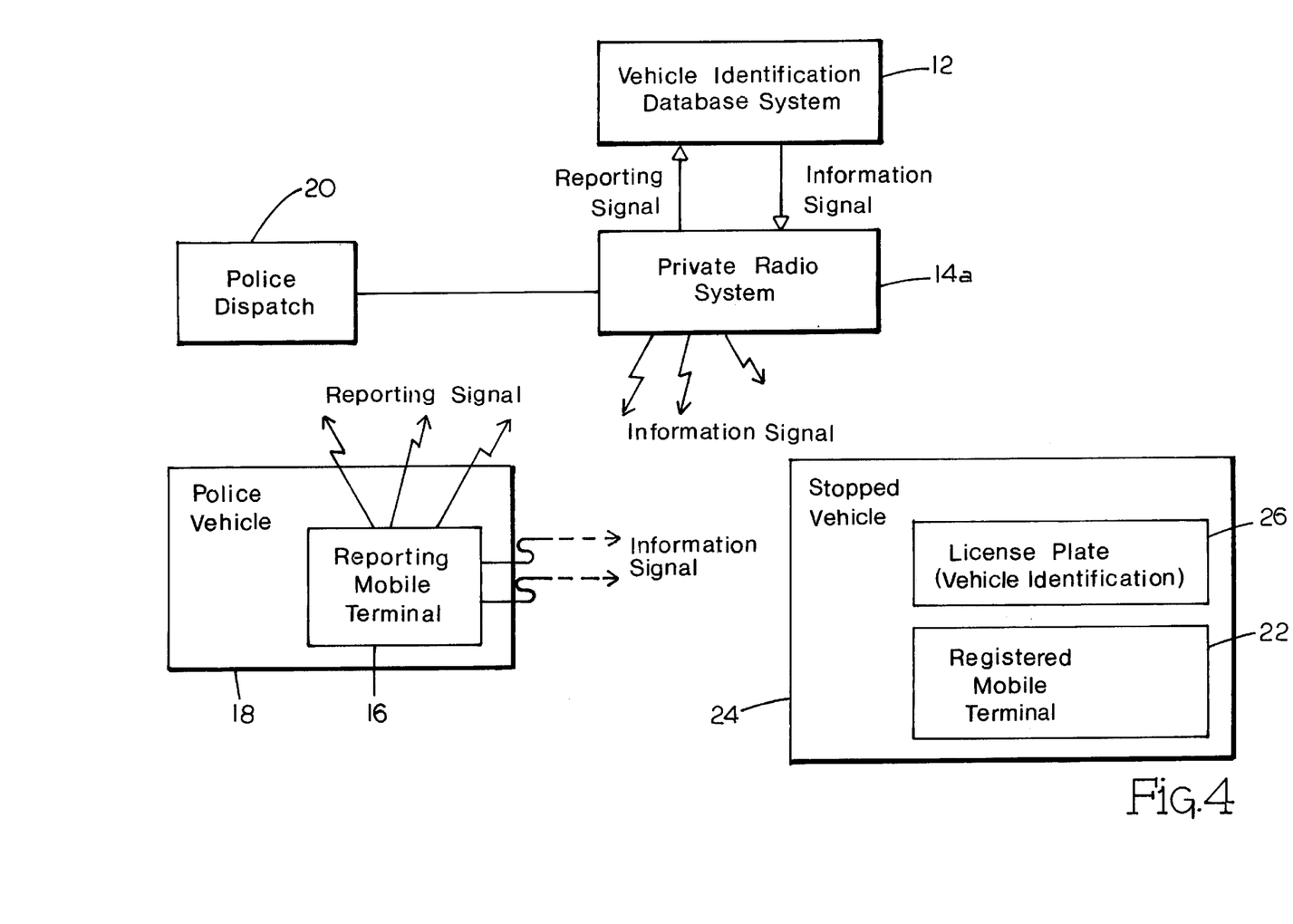
FIG. 4 is a block diagram of a second preferred embodiment of a communications system according to the present invention.

Turning to FIG. 4, a second preferred embodiment of communications system 10 is shown. As described below, communications system 10 of the second preferred embodiment sends the selected associated information first to reporting mobile terminal 16 and the reporting mobile terminal 16 then transmits the associated information to the registered mobile terminal 22. Communications system 10 includes a database system 12 coupled to private radio system 14a. A reporting mobile terminal 16 in a police vehicle 18 reports a vehicle identification to database system 12 by transmitting a reporting signal to database system 12 as described with respect to the first preferred embodiment. The reporting signal includes the reported vehicle identification and header data identifying the data being transmitted as being a vehicle identification. In addition, the reporting signal can include a mobile phone number for reporting mobile terminal 16 and the police officer's badge number and date. Database system 12 selects associated information corresponding to the reported vehicle identification as described with respect to the first preferred embodiment. The selected associated information includes the selected mobile number corresponding to the registered mobile terminal 22 and a selected message such as a password, codeword, or voice message.

Database system 12 of the second preferred embodiment uses the private radio system 14a to send the selected associated information to the reporting mobile terminal 16. The database system 12 transmits an information signal to the private radio system 14a which transmits the information signal to reporting mobile terminal 16. A standard data channel is used by private radio system 14a to transmit the information signal to reporting mobile terminal 16. Database system 12 can be coupled to private radio system 14a via police dispatch 20 or the public switch telephone network.

Upon receipt of the information signal, reporting mobile terminal 16 displays the selected phone number and selected message to the police officer. The selected mobile number is also stored in the reporting mobile terminal 16 for use by the police officer. Depending on the type of reporting mobile terminal 16 used by the police officer or whether a mobile terminal similar to the registered mobile terminal 22 is available to the police officer, the police officer can use the selected mobile number to call the registered mobile terminal 22 of the driver. The reporting mobile terminal 16 can also be programmed to call the registered mobile terminal 22 in response to receiving the selected phone number.

Upon receipt of the selected associated information, the reporting mobile terminal 16 is programmed to transmit the selected message to the registered mobile terminal 22. More specifically, the reporting mobile terminal 16 transmits an information signal including the selected message in response to receiving the information signal from private radio system 14a. The information signal includes a header identifying the phone number of the registered mobile terminal 22. The header can also include data instructions commanding the reporting mobile terminal 16 to transmit the selected message to the registered mobile terminal 22. The information signal is transmitted from the reporting mobile terminal 16 over a selected channel or frequency band.

Figure 5:
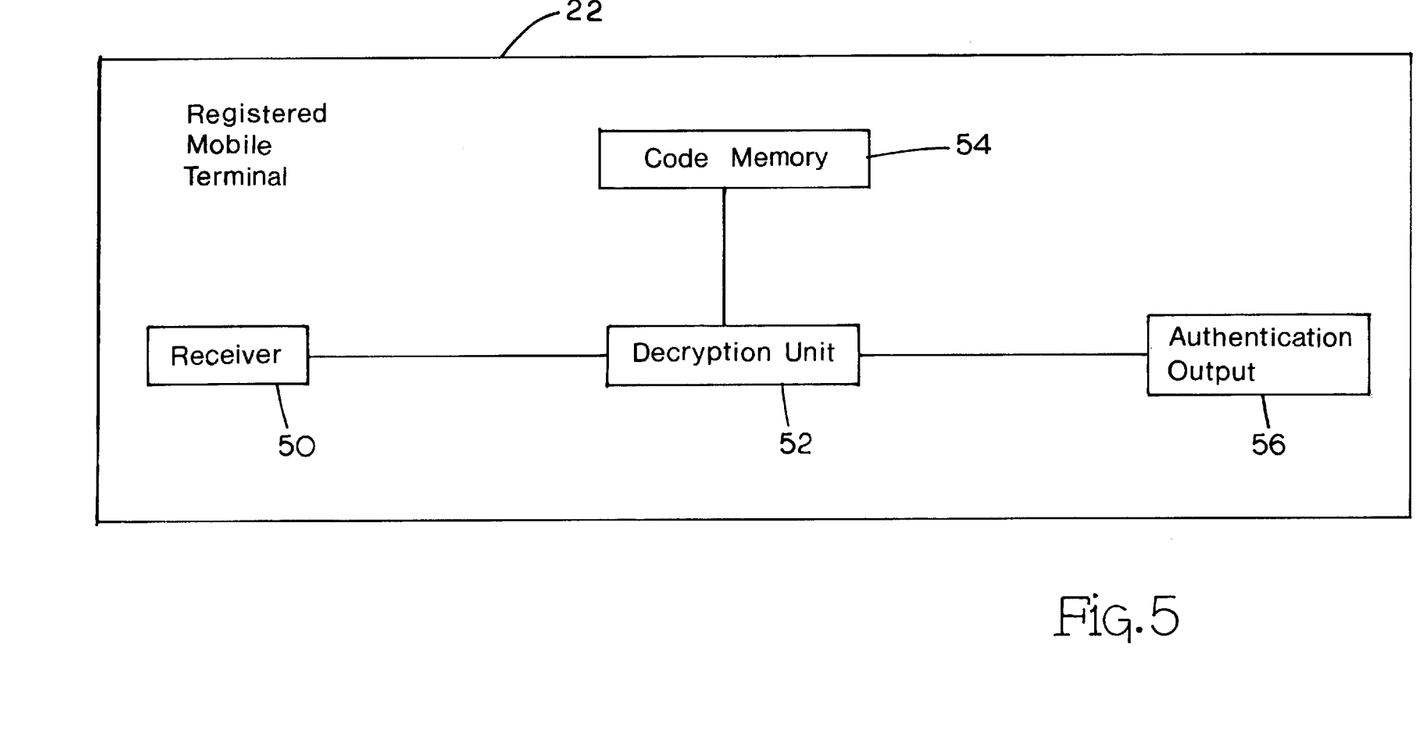
FIG. 5 is a block diagram of a registered mobile terminal according to the present invention.

Referring to FIG. 5, the registered mobile terminal 22 is designed to receive the transmitted information signal transmitted by reporting mobile terminal 16. The registered mobile terminal 22 can be a low-cost, battery-operated, pocket-sized cellular phone. As shown in FIG. 5, the registered mobile terminal 22 includes a receiver 50, a decryption unit 52, a code memory 54, and an authentication output 56. The receiver 50 receives radio signals transmitted over the selected channel or frequency band over which the reporting mobile terminal 16 transmits the information signal. The receiver 50 receives the information signal transmitted by reporting mobile terminal 16. When communications system 10 is designed to transmit selected codewords to the registered mobile terminal, the decryption unit 52 functions as a comparator to compare or correlate the received codeword with a stored codeword in code memory 54. If the received codeword and stored codeword correspond with one another then a positive authentication signal is output to the authentication output 56. If the received codeword and stored codeword do not correspond, then a negative authentication signal is output to the authentication output 56. The authentication output 56 can be a display or speaker used to indicated to a driver whether the codeword corresponding to the vehicle identification of the stopped vehicle 24 has been received.

A public key system can also be used to encrypt selected messages sent from database system 12. Before transmitting from database system 12, the selected message is encrypted using a codeword key corresponding to the reported vehicle identification. The encrypted selected message is transmitted to the reporting mobile terminal 16 and then from the reporting mobile terminal 16 to the registered mobile terminal 22. The registered mobile terminal 22 includes the corresponding codeword key stored in the code memory 54 that is used to decrypt the selected message which may be a password known to the driver. The information signal may also include other encrypted information such as the police officer's badge number and the date. This additional information could be used to help verify that the message was not an old message or a message sent to a different police officer that had been intercepted on a prior occasion.

In an alternative second preferred embodiment of communications system 10, the information signal from database system 12 is transmitted from private radio system 14a directly to the registered mobile terminal 22. The information signal from private radio system 14a is transmitted in the area of police vehicle 18 and stopped vehicle 24 on the selected frequency band monitored by the receiver 50 of the registered mobile terminal 22. Registered mobile terminal 22 thus receives the information signal directly from the private radio system 14a.

In operation, the communications system 10 of the second preferred embodiment operates as follows. As described with respect to the first preferred embodiment of communications system 10, a police officer reports the vehicle identification on vehicle 24 to database system 12, and database system 12 selects associated information corresponding to the reported vehicle identification.

Database system 12 of the second preferred embodiment transmits an information signal via private radio system 14a to the reporting mobile terminal 16 used by the police officer. The police officer receives the selected associated information and the phone number of the registered mobile terminal 22 is displayed for the police officer's use. The displayed phone number can be used to call the driver of the vehicle 24.

The reporting mobile terminal 16 also transmits an information signal including the received selected message to the registered mobile terminal 22 in the stopped vehicle 24. The registered mobile terminal 22 receives the information signal from the reporting mobile terminal 16. In the alternate second preferred embodiment, the information signal is transmitted directly from private radio system 14a to registered mobile terminal 22. The received information signal is deciphered and the registered mobile terminal 22 outputs an authentication output. The driver of the stopped vehicle 24 uses the authentication output to help verify the authenticity of the police officer.

Specific details of the block elements of the digital communication system 10 described above are well known in the prior art and a detailed discussion of such is not deemed necessary. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is merely for purposes of providing a full and enabling disclosure of the invention. Accordingly, it is intended that the invention be limited only be the spirit and scope of the claims appended hereto.

What is claimed is:

1. A communications system, comprising:
    a) a radio system for communicating with mobile terminals and receiving a reporting signal including a reported vehicle identification from a reporting mobile terminal;
    b) a database system coupled to said radio system, said database system comprising:
        i) a memory having registered vehicle identifications and associated information;
        ii) an input unit coupled to said radio system for inputting to said database system said reporting signal;
        iii) an output unit coupled to said radio system;
        iv) a processor for identifing a registered vehicle identification stored in said memory corresponding to said reported vehicle identification and selecting associated information corresponding to said identified registered vehicle identification, said processor directing said output unit to send said selected associated information to said radio system for transmission to a mobile terminal; and
    c) wherein said selected associated information associated with said reported vehicle identification is transmitted to a mobile terminal in response to said radio system receiving a reporting signal from a reporting mobile terminal.

2. The communications system of registered claim 1, wherein said stored associated information includes phone numbers for mobile terminals and said selected associated information includes a selected phone number associated with said reported vehicle identification.

3. The communications system of claim 1, wherein said stored associated information includes messages and said selected associated information includes a selected message associated with said reported vehicle identification.

4. The communications system of claim 3, wherein said messages include passwords associated with said registered vehicle identifications and said selected message includes a selected password associated with said reported vehicle identification.

5. The communications system of claim 3, wherein said messages include codeword keys associated with said stored vehicle identifications and said selected message includes a selected codeword key associated with said inputted vehicle identification.

6. The communications system of claim 3, wherein said messages include recorded voice messages associated with said registered vehicle identifications and said selected message includes a selected voice message associated with said reported vehicle identification.

7. The communications system of claim 2, wherein said processor directs said output unit to use said selected phone number to call a registered mobile terminal associated with said reported vehicle identification so as to provide a communication link between said database system and a registered mobile terminal associated with said reported vehicle identification.

8. The communications system of claim 7, wherein said associated information includes messages and said selected associated information includes a selected message associated with said reported vehicle identification, and wherein said selected message is sent to said registered mobile terminal using said communication link between said database system and said registered mobile terminal.

9. The communications system of claim 1, wherein said database system further includes an encryption unit for encrypting said selected associated information prior to transmitting said selected associated information.

10. The communications system of claim 1, wherein said radio system transmits said selected associated information to said reporting mobile terminal.

11. The communications system of claim 1, wherein said associated information includes phone numbers and said selected associated information includes a selected phone number for a registered mobile terminal associated with said reported vehicle identification.

12. The communications system of claim 1, wherein said radio system transmits said selected associated information to a registered mobile terminal associated with said reported vehicle identification.

13. A database system, comprising:
    a) a memory having registered vehicle identifications and associated information, wherein said stored associated information includes phone numbers for registered mobile terminal associated with vehicle identifications;

b) an input unit for inputting to said database system a reporting signal including a reported vehicle identification;

c) an output unit;

d) a processor for identifying a registered vehicle identification corresponding to said reported vehicle identification and selecting associated information including a phone number corresponding to said identified registered vehicle identification, said processor directing said output unit to use said selected phone number to call a registered mobile terminal associated with said reported vehicle identification;

e) wherein a communication link is provided between said database system and said registered mobile terminal in response to the inputting of said reported vehicle identification into said database system.

14. The database system of claim 13, wherein said associated information includes messages and said selected associated information includes a selected message associated with said reported vehicle identification, and wherein said selected message is sent to said registered mobile terminal over said communication link in response to the inputting of said reported vehicle identification into said database system.

15. The database system of claim 13, wherein said messages include passwords associated with said registered vehicle identifications and said selected message includes a selected password associated with said reported vehicle identification.

16. The database system of claim 14, wherein said messages include codeword keys associated with said registered vehicle identifications and said selected message includes a selected codeword key associated with said reported vehicle identification.

17. The database system of claim 14, wherein said messages include recorded voice messages and said selected message includes a selected voice message associated with said reported vehicle identification.

18. The database system of claim 13, wherein said input unit is coupled to a private radio system for receiving said reported vehicle identification signal from a reporting mobile terminal operable in said private radio system.

19. The database system of claim 13, wherein said output unit is coupled to a public radio system for enabling said output unit to call said registered mobile terminal operable in said public radio system.

20. The database system of claim 13, further including an encryption unit for encrypting said selected associated information prior to transmitting said selected associated information to a mobile terminal.

21. A database system, comprising:

a) a memory having registered vehicle identifications and associated information;

b) an input unit for inputting to said database system a reported signal including a reported vehicle identification;

c) an output unit;

d) a processor for identifying a registered vehicle identification stored in said memory corresponding to said reported vehicle identification and selecting associated information associated with said identified registered vehicle identification, said processor directing said output unit to send said selected associated information to a mobile terminal;

e) wherein a communication link is provided between said database system and a mobile terminal in response to the inputting of said reported vehicle identification into said database system.

22. The database system of claim 21, wherein said stored associated information includes messages and said selected associated information includes a selected message associated with said reported vehicle identification.

23. The database system of claim 22, wherein said messages include passwords associated with said registered vehicle identifications and said selected message includes a selected password associated with said reported vehicle identification.

24. The database system of claim 22, wherein said messages include codeword keys associated with said registered vehicle identifications and said selected message includes a selected codeword key associated with said reported vehicle identification.

25. The database system of claim 22, wherein said messages include recorded voice messages and said selected message includes a selected voice message associated with said reported vehicle identification.

26. The vehicle identification database system of claim 21, wherein said stored associated information includes phone numbers for registered mobile terminals and said selected associated information includes a selected phone number for a registered mobile terminal associated with said reported vehicle identification.

27. The database system of claim 21, wherein said input unit is coupled to a radio system for receiving said reporting signal from a reporting mobile terminal and said output unit is coupled to said radio system for sending said selected associated information to said reporting mobile terminal.

28. The database system of claim 21, wherein said input unit is coupled to a radio system for receiving said reporting signal from a reporting mobile terminal and said output unit is coupled to said radio system for sending said selected associated information to a registered mobile terminal associated with said reported vehicle identification.

29. The vehicle identification database system of claim 21, further including an encryption unit for encrypting said selected stored information prior to transmitting said selected stored information to a mobile terminal.

30. A communications system, comprising:

a) a reporting mobile terminal for transmitting a reporting signal including a vehicle identification to a radio system;

b) a database system coupled to the radio system, said database system comprising:

i) a memory having registered vehicle identifications and associated information;

ii) an input unit for receiving said reporting signal from said radio system;

iii) an output unit coupled to said radio system;

iv) a processor for identifying a registered vehicle identification corresponding to said reported vehicle identification and selecting associated information corresponding to said reported vehicle identification, said processor directing said output unit to send information signal including said selected associated information to said radio system for transmission;

c) a registered mobile terminal for receiving said information signal including said selected associated information, said registered mobile terminal comprising:

i) a receiver for receiving said information signal, ii) a terminal output for outputting information corresponding to said received associated information to a user of said registered mobile terminal in response to receiving said information signal.

31. The communications system of claim 30, wherein said associated information includes messages and said selected associated information includes a selected message associated with said reported vehicle identifications.

32. The communications system of claim 31, wherein said messages include passwords associated with said registered vehicle identifications and said selected message includes a selected password associated with said reported vehicle identification.

33. The communications system of claim 31, wherein said messages include codeword keys associated with registered vehicle identifications and said selected message includes a selected codeword key associated with said reported vehicle identification.

34. The communications system of claim 33, wherein said corresponding codeword key is stored in said registered mobile terminal for use in decrypting said selected message transmitted to said registered mobile terminal.

35. The communications system of claim 31, wherein said messages include recorded voice messages and said selected message includes a selected voice message associated with said reported vehicle identification.

36. The communications system of claim 30, wherein said stored associated information includes phone numbers and said selected associated information includes a selected phone number associated with said reported vehicle identification.

37. The communications system of claim 30, wherein said input unit is coupled to a radio system for receiving said reporting signal from a reporting mobile terminal and said output unit is coupled to said radio system for sending said selected associated information to said reporting mobile terminal.

38. The communications system of claim 30, wherein said information signal is transmitted from said radio system to said reporting mobile terminal, and wherein said reporting mobile terminal transmits said associated information to said mobile terminal.

39. The communications system of claim 30, wherein said input unit is coupled to a radio system for receiving said reporting signal from a reporting mobile terminal and said output unit is coupled to said radio system for sending said selected associated information to a registered mobile terminal associated with said reported vehicle identification.

40. The communications system of claim 30, further including an encryption unit for encrypting said selected stored information prior to transmitting said selected stored information to a mobile terminal.

41. A method of sending information corresponding to a vehicle identification to a mobile terminal, comprising:
   a) receiving a reporting signal including a reported vehicle identification from a reporting mobile terminal;
   b) communicating said reported vehicle identification from said radio system to a database system having registered vehicle identifications and associated information;
   c) identifying a registered vehicle identification stored in said database system corresponding to said reported vehicle identification;
   d) selecting associated information corresponding to said identified registered vehicle identification; and
   e) sending said selected associated information to said radio system for transmission to a mobile terminal.

42. The method of claim 41, wherein said associated information includes phone numbers for mobile terminals and said selected associated information includes a selected phone number associated with said reported vehicle identification.

43. The method of claim 41, wherein said stored associated information includes messages and said selected associated information includes a selected message associated with said reported vehicle identification.

44. The method of claim 43, wherein said messages include passwords associated with said registered vehicle identifications and said selected message includes a selected password associated with said reported vehicle identification.

45. The method of claim 43, wherein said messages include codeword keys associated with said stored vehicle identifications and said selected message includes a selected codeword key associated with said inputted vehicle identification.

46. The method of claim 43, wherein said messages include recorded voice messages associated with said registered vehicle identifications and said selected message includes a selected voice message associated with said reported vehicle identification.

47. The method of claim 41, further comprising the step of calling a registered mobile terminal associated with said reported vehicle identification using said selected phone number so as to provide a communication link between said database system and said registered mobile terminal associated with said reported vehicle identification.

48. The method of claim 41, wherein said associated information includes messages and said selected associated information includes a selected message associated with said reported vehicle identification, and further comprising the step of sending said selected message to said registered mobile terminal using said communication link between said database system and said registered mobile terminal.

49. The method of claim 41, further comprising the step of sending said selected associated information to said reporting mobile terminal.

50. The method claim 41, further comprising the step of sending said selected associated information from said reporting mobile terminal to said registered mobile terminal.

51. The method of claim 41, wherein said radio system transmits said selected associated information from said radio system to a registered mobile terminal associated with said reported vehicle identification.

* * * * *